United States Patent [19]

Ohira et al.

[11] Patent Number: 4,745,486

[45] Date of Patent: May 17, 1988

[54] HELICAL SCAN TYPE MAGNETIC RECORDING APPARATUS

[75] Inventors: Tsunehisa Ohira; Haruki Ogata, both of Sagamihara, Japan

[73] Assignee: Victor Company of Japan, Ltd., Tokyo, Japan

[21] Appl. No.: 846,917

[22] Filed: Apr. 1, 1986

[30] Foreign Application Priority Data

Apr. 2, 1985 [JP] Japan ................................. 60-69287

[51] Int. Cl.⁴ .............................................. H04N 9/79
[52] U.S. Cl. .................................... 358/310; 358/340; 360/70
[58] Field of Search ............... 358/310, 328, 335, 340; 360/22, 70

[56] References Cited

U.S. PATENT DOCUMENTS

| | | | |
|---|---|---|---|
| 4,559,567 | 12/1985 | Maruichi et al. | 358/340 |
| 4,608,609 | 8/1986 | Takano et al. | 358/310 |
| 4,626,927 | 12/1986 | Hirota et al. | 358/310 |
| 4,700,239 | 10/1987 | Yoshinaka et al. | 358/310 |

FOREIGN PATENT DOCUMENTS

| | | | |
|---|---|---|---|
| 0195097 | 8/1986 | Japan . | |
| 0195096 | 8/1986 | Japan . | |
| 2136243 | 9/1984 | United Kingdom | 358/310 |

*Primary Examiner*—Russell E. Adams
*Attorney, Agent, or Firm*—Michael N. Meller

[57] ABSTRACT

A helical scan type magnetic recording apparatus forms tracks which are mutually separated in a width direction of a magnetic tape. The apparatus comprises n pairs of rotary heads for simultaneously and independently forming n oblique tracks which are mutually separated in the width direction of the magnetic tape, where n is equal to two or three, first and second stationary heads for forming audio and control tracks, respectively, and a third stationary head for recording a specific information signal by forming a specific information signal recording track in a recording region other than recording regions in which the audio and control tracks are formed out of three or four recording regions in which the oblique tracks are not formed.

5 Claims, 6 Drawing Sheets

HELICAL SCAN TYPE MAGNETIC RECORDING APPARATUS

BACKGROUND OF THE INVENTION

The present invention generally relates to helical scan type magnetic recording apparatuses which form tracks mutually separated in a width direction of a magnetic tape, and more particularly to a helical scan type magnetic recording apparatus which records three kinds of signals constituting a color video signal on a plurality of oblique tracks which are mutually separated in the width direction of the magnetic tape by use of a plurality of pairs of rotary heads which simultaneously and independently form the plurality of oblique tracks, and also forms one or two audio tracks, a control track and a specific information signal recording track along a longitudinal direction of the magnetic tape by use of stationary heads.

A helical scan type magnetic recording and reproducing apparatus (hereinafter simply referred to as a VTR) which uses a magnetic tape having a width of ½ inch is presently used in various fields. However, in the VTR for home use, the frequency band in which the recording and reproduction can be performed is relatively narrow. For this reason, in the VTR for home use, a luminance signal separated from a color video signal is frequency-modulated and a carrier chrominance signal separated from the color video signal is frequency-converted into a low frequency range, and the frequency modulated luminance signal and the frequency converted carrier chrominance signal are frequency-division-multiplexed and recorded on and reproduced from the tape. In the present specification, such a recording and reproducing system in which the carrier chrominance signal is frequency-converted into the low frequency range will be referred to as a low-band conversion system. Further, in the VTR for home use, the tape utilization efficiency is improved by employing a system which does not form guard bands at the time of the recording and uses rotary heads having gaps of mutually different azimuth angles to record two mutually adjacent tracks.

On the other hand, in the VTR for business use such as broadcasting and especially in the case of a one-body type VTR having a camera unitarily built therein, there are demands to downsize the apparatus, reduce the weight of the apparatus and obtain a reproduced color video signal having a high picture quality. Hence, the luminance signal and color difference signals are recorded on independent tracks on the tape which has a width identical to that used in the VTR for home use by rotary heads so that a guard band is formed between two mutually adjacent tracks. In the present specification, such a recording and reproducing system will be referred to as a Y/C separation system.

According to the VTR employing the Y/C separation system, during a time period in which one rotary head records one field of the luminance signal on one track, another rotary head records one field of the color difference signals on another track. Thus, two tracks are simultaneously formed in each time period of one field. The tracks recorded with the luminance signal and the track recorded with the color difference signals are formed adjacent to each other along a longitudinal direction of the tape.

The luminance signal and the color difference signals are recorded on and reproduced from independent tracks on the tape according to the Y/C separation system. For this reason, although a moire occurs in the case of the VTR employing the low-band conversion system when the frequency modulated luminance signal and the frequency converted carrier chrominance signal are simultaneously recorded on the same track on the tape which is a non-linear transmission system, such a moire will not occur according to the VTR employing the Y/C separation system. In addition, it is possible to reserve sufficiently wide frequency bands for recording and reproducing the luminance signal and the color difference signals. Further, because the VTR employing the Y/C separation system does not record the frequency converted carrier chrominance signal by using the frequency modulated luminance signal as a bias signal, it is possible to improve the signal-to-noise (S/N) ratio of the reproduced color difference signals. As a result, it is possible to obtain a reproduced color video signal having a high picture quality compared to the VTR employing the low-band conversion system.

However, the tape utilization efficiency is poor according to the Y/C separation system because of the need to provide the guard band. Moreover, in the case where the rotary head crosses a guard band at the time of the reproduction and scans a track which is adjacent to the intended track which is to be scanned, the rotary head which should reproduce the luminance signal (or the color difference signals) will reproduce the color difference signals (or the luminance signal) since two mutually adjacent tracks are independently recorded with the luminance signal and the color difference signals. There is no field correlation between the reproduced signals from the two mutually adjacent tracks, and thus, it is impossible to eliminate the crosstalk by a crosstalk cancelling method which uses the field correlation as is done in the VTR for home use which employs the low-band conversion system. Hence, the VTR employing the Y/C separation system has a problem in that the crosstalk is conspicuous in the reproduced picture.

The conventional VTR employing the Y/C separation system simultaneously records and reproduces the luminance signal and the color difference signals on and from independent tracks on the tape by a pair of rotary heads having gaps of mutually different azimuth angles. For this reason, when a tracking error occurs at the time of the reproduction, there is a problem in that a time difference occurs between the reproduced luminance signal and the reproduced color difference signals from the pair of rotary heads.

Accordingly, in order to eliminate the problems described above, recording and reproducing apparatuses were previously proposed in a Japanese Utility Model Application No. 57-66496 (Japanese Laid-Open Utility Model Application No. 58-170012), Japanese Patent Application No. 60-35827 and Japanese Patent Application No. 60-35828 in which the applicant is the same as the assignee of the present application. According to the previously proposed apparatuses, three kinds of signals constituting the color video signal are recorded on and reproduced from a plurality of tracks which are formed in recording regions of the tape which are separated from each other in the width direction of the tape. Since the recording regions in which the plurality of tracks are simultaneously and independently formed on the tape are completely separated from each other, it is possible to prevent mutual interference among the signals reproduced from the tracks in the different recording regions and hence eliminate the problems of the conventional apparatus.

However, in the previously proposed apparatuses or the one-body type VTR for broadcasting use described before, three kinds of tracks are formed along the longitudinal direction of the tape by use of stationary heads in addition to the oblique tracks which are formed by the rotary heads. The three kinds of tracks are one or two audio tracks, a control track and a time code track.

The one or two audio tracks are recorded with audio signals, and the control track is recorded with a control pulse signal having a period of one frame, for example. The time code track is recorded with a time code signal which is used to detect an absolute address on the tape. The time code signal is in accordance with a standard set by Society of Motion Picture and Television Engineers (SMPTE), for example.

Out of the three kinds of tracks, the control track and the time code track are formed adjacent to each other at a lower end portion of the tape. Details of the track pattern used in the one-body type VTR for broadcasting use are disclosed in a Japanese journal "The Journal of the Institute of Television Engineers of Japan", April issue (1984), pages 96 and 97, for example. The reason why the control track and the time code track are formed at the lower end portion of the tape is as follows. Firstly, it is easier to record on a central portion of the tape the luminance signal and the color difference signals which are most important out of the information signals recorded on the tape. Secondly, a crosstalk introduced from an adjacent track when the control track and the time code track are formed adjacent to each other can be reduced by providing a guard band between the control track and the time code track.

However, the frequencies of the control pulse signal and the time code signal are relatively low, and the control pulse signal and the time code signal are usually recorded after the levels thereof are amplified due to the saturation recording which is employed. For this reason, since the stationary heads which form the control track and the time code track are arranged adjacent to each other, the control pulse signal and the time code signal which are to be recorded mutually interfere and this mutual interference may introduce undesirable effects on each other. Especially because the control pulse signal and the time code signal are timing signals related to time, the mutual interference should never occur.

On the other hand, due to the provision of the guard band between the control track and the time code track, a recordable region on the tape is not effectively utilized in the apparatuses described before.

SUMMARY OF THE INVENTION

Accordingly, it is a general object of the present invention to provide a novel and useful helical scan type magnetic recording apparatus in which the problems described heretofore are eliminated.

Another and more specific object of the present invention is to provide a helical scan type magnetic recording apparatus which records three kinds of signals constituting a color video signal on a plurality of oblique tracks which are mutually separated in a width direction of a magnetic tape by use of a plurality of pairs of rotary heads which simultaneously and independently form the plurality of oblique tracks, and also records audio signals, a control pulse signal and a specific information signal respectively on one or two audio tracks, a control track and a specific information signal recording track along a longitudinal direction of the magnetic tape by use of stationary heads which form the one or two audio tracks, the control track and the specific information signal recording track which are mutually separated in the width direction of the magnetic tape. According to the recording apparatus of the present invention, it is possible to completely eliminate mutual interference among three kinds of signals which are respectively recorded on the one or two audio tracks, the control track and the specific information signal recording track, and moreover, a recordable region on the magnetic tape is effectively utilized.

Still another object of the present invention is to provide a helical scan type magnetic recording apparatus in which, out of at least three positions including upper and lower end portions of a magnetic tape and a guard band portion formed between a plurality of oblique tracks which are mutually separated in a width direction of the magnetic tape, a control track is formed in the lower end portion of the magnetic tape and a time code track is formed in one of the remaining portions of the magnetic tape. According to the recording apparatus of the present invention, it is possible to minimize effects of dropouts caused by damage to a magnetic surface of the magnetic tape and bends in the magnetic tape at the lower end portion thereof due to contact of the lower end portion of the magnetic tape with a flange portion of a tape guide which guides the lower end portion of the magnetic tape.

A further object of the present invention is to provide a helical scan type magnetic recording apparatus which selectively records one of a time code signal and an audio signal on a specific information signal recording track which is formed by a stationary head. According to the recording apparatus of the present invention, it is possible to perform a type of recording which is sometimes referred to as an after-recording in which the audio signal is recorded on a magnetic tape which is pre-recorded with information signals, and it is thus possible to widen the application of the recording apparatus.

Other objects and further features of the present invention will be apparent from the following detailed description when read in conjunction with the accompanying drawings.

DETAILED DESCRIPTION

Figure 1:
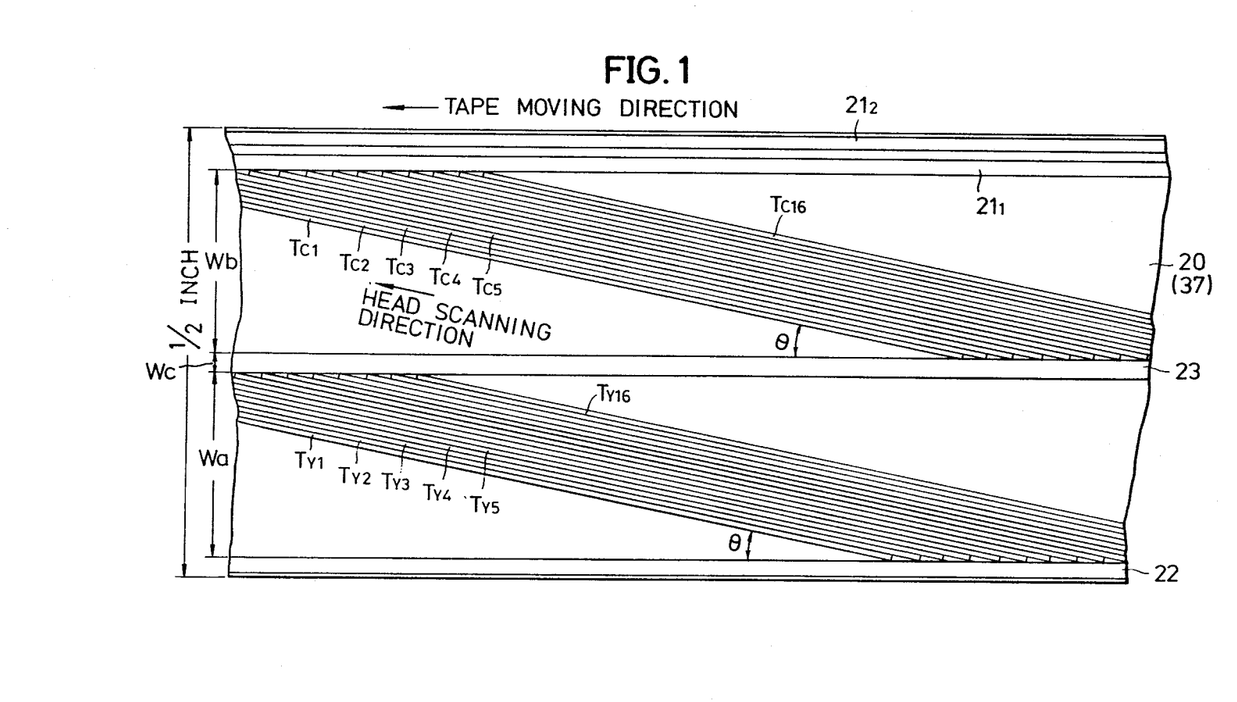
FIG. 1 shows an embodiment of a track patern formed on a magnetic tape by the helical scan type magnetic recording apparatus according to the present invention.
Figure 2:
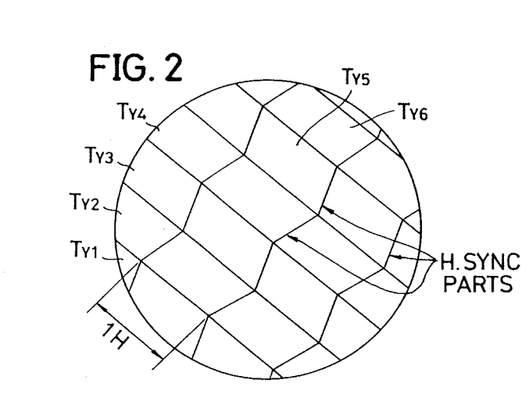
FIG. 2 shows a part of the track pattern shown in FIG. 1 on an enlarged scale.
Figure 11:
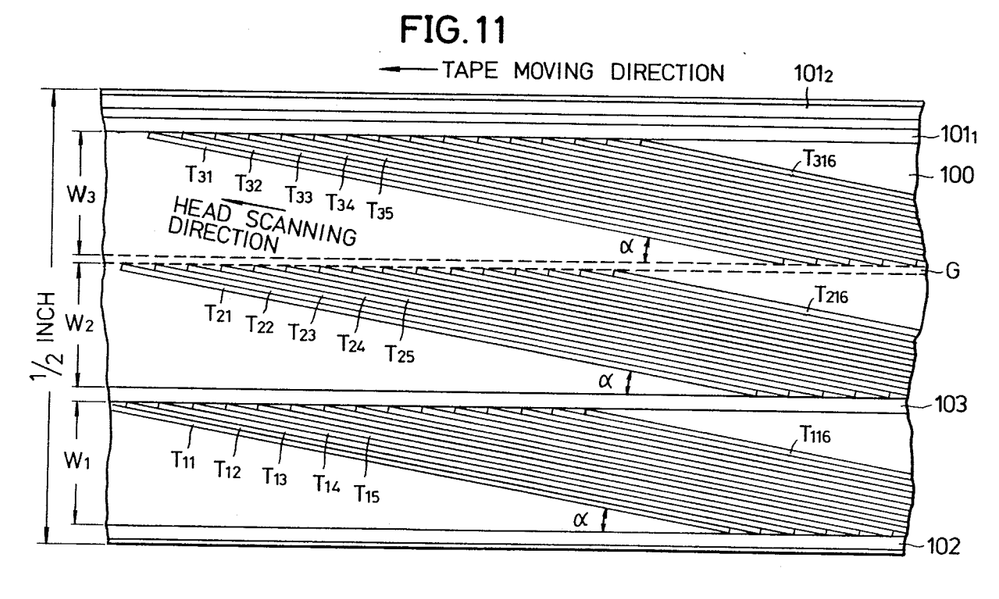
FIG. 11 shows another embodiment of a track pattern formed on the magnetic tape by the helical scan type magnetic recording apparatus according to the present invention.

FIG. 1 shows an embodiment of a track pattern formed on a magnetic tape by the helical scan type magnetic recording apparatus according to the present invention. In FIG. 1, a magnetic tape 20 has a width of ½ inch. An audio track $21_1$ recorded with a right-channel audio signal and an audio track $21_2$ recorded with a left-channel audio signal are formed in an upper end portion of the tape 20 along a longitudinal direction of the tape 20. A control track 22 recorded with a control pulse signal is formed on a lower end portion of the tape 20 along the longitudinal direction of the tape 20. Recording regions Wa and Wb respectively having a predetermined width in a width direction of the tape 20 exist between a lower edge of the audio track $21_1$ and an upper edge of the control track 22. First oblique tracks (video tracks) $T_{Y1}$ through $T_{Y16}$ are successively formed in the recording region Wa without a guard band and with an inclination angle $\theta$ with respect to the longitudinal direction of the tape 20, and second oblique tracks (video tracks) $T_{C1}$ through $T_{C16}$ are successively formed in the recording region Wb without a guard band and with an inclination angle $\theta$ with respect to the longitudinal direction of the tape 20. As will be described later on in the specification, first and second rotary heads Y1 and Y2 shown in FIGS. 6A and 6B for recording a luminance signal record a frequency modulated (FM) luminance signal on the first oblique tracks $T_{Y1}$ through $T_{Y16}$, and first and second rotary heads C1 and C2 shown in FIGS. 6A and 6B for recording color difference signals record frequency modulated (FM) color difference signals on the second oblique tracks $Y_{C1}$ the $Y_{C16}$. In FIG. 1 and FIG. 11 which will be described later, only sixteen tracks are shown in one recording region, for convenience' sake. As shown in FIG. 2 which shows a part of the track pattern shown in FIG. 1 on an enlarged scale, horizontal synchronizing signals recorded on the tracks $T_{Y1}$ through $T_{Y16}$ are aligned in the width direction of the tape 20. That is, the horizontal synchronizing signals are recorded with the so-called H-alignment.

Furthermore, as shown in FIG. 1, a guard band portion Wc is formed between the first oblique tracks $T_{Y1}$ through $T_{Y16}$ and the second oblique tracks $T_{C1}$ through $T_{C16}$, that is, between the recording regions Wa and Wb. A time code signal is recorded on a time code track 23 by a stationary head (not shown) which forms the time code track 23 in the guard band portion Wc.

Figure 3:
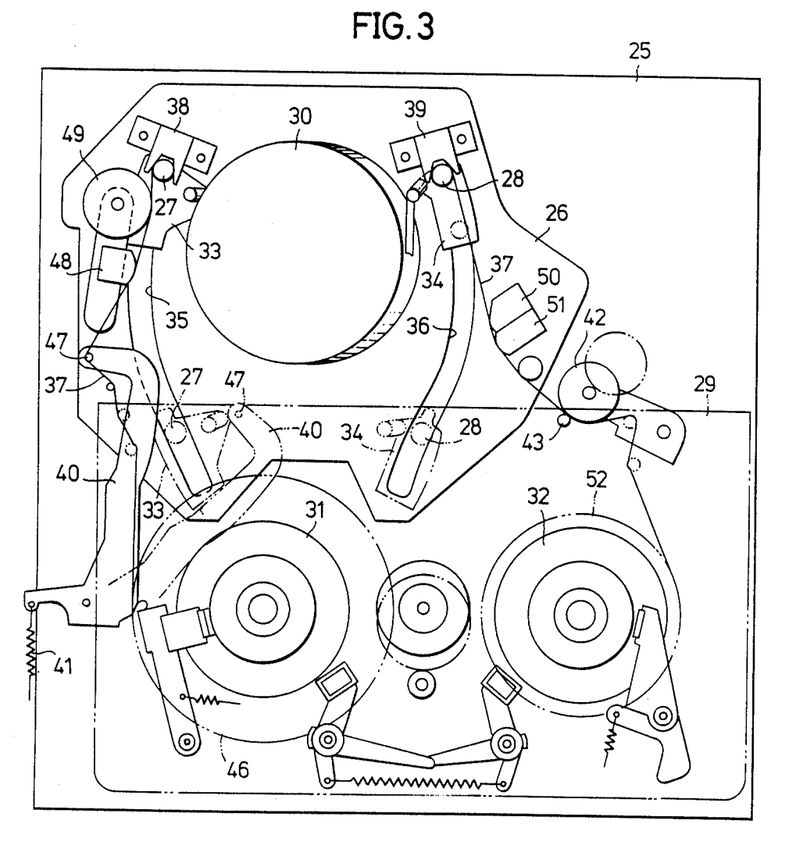
FIG. 3 is a plan view showing an example of a tape moving mechanism of the helical scan type magnetic recording apparatus according to the present invention.

Next, description will be given with respect to a tape moving system and the constructions of heads in the helical scan type magnetic recording apparatus according to the present invention which forms the track pattern shown in FIG. 1, by referring to FIG. 3. In FIG. 3, the tape moving system itself is known. As will be described later, the present invention is characterized by the constructions of rotary and stationary heads and the like. In FIG. 3, the tape moving mechanism generally comprises a main chassis 25, a sub-chassis 26 provided on the main chassis 25, loading poles 27 and 28, an upper rotary drum 30, a supply reel disc 31 and a take-up reel disc 32. A tape cassette 29 is indicated by a two-dot chain line. A tape loading mechanism is arranged on an upper surface of the main chassis 25 below the sub-chassis 26. In a stop mode of the recording apparatus, each of members shown in FIG. 3 are at positions indicated by two-dot chain lines.

When the mode of the recording apparatus is set to a recording mode (or when the mode is set to a reproducing mode in the case of a recording a reproducing apparatus), loading rings (not shown) which constitute the tape loading mechanism rotate and loading pole supports 33 and 34 respectively move along guide grooves 35 and 36 of the sub-chassis 26. As a result, a magnetic tape 37 is drawn out of the tape cassette 29 by the loading poles 27 and 28. The loading pole supports 33 and 34 respectively move to final positions where the loading poles 27 and 28 push against respective stoppers 38 and 39. As the loading pole support 33 moves, a tension arm 40 is rotated counterclockwise by a spring 41, and a tension is introduced in a brake band (not shown). In addition, at the final stage of the operation of the tape loading mechanism, a pinch roller 42 pushes against a capstan 43.

Hence, the tape 37 is loaded in a following predetermined tape path. That is, the tape 37 is paid outside the tape cassette 29 from a supply tape roll 46 within the tape cassette 29, and makes contact with a tension pole 47, a full width erasing head 48 and an impedance roller 49. The tape 37 is then wrapped obliquely around an outer peripheral surface of the upper rotary drum 30 over a predetermined angular range, and makes contact with an audio and time code erasing head 50 and a stationary head part 51 which constitutes an essential part of the present invention. Finally, the tape 37 enters within the tape cassette 29 and is taken up on a tape take-up roll 52. The tape 37 is driven in a state pinched between the pinch roller 42 and the capstan 43.

Figure 4:
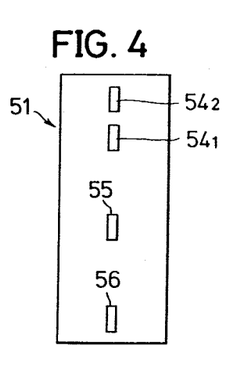
FIG. 4 shows the construction of an embodiment of a stationary head of the helical scan type magnetic recording apparatus according to the present invention.

As shown in FIG. 4, the stationary head part 51 comprises stationary audio heads $54_1$ and $54_2$ for forming the audio tracks $21_1$ and $21_2$ described before, a stationary time code head 55 for forming the time code track 23 and a stationary control head 56 for forming the control track 22. The heads $54_1$, $54_2$, 55 and 56 are arranged in-line along the width direction of the tape 37.

Figure 5:
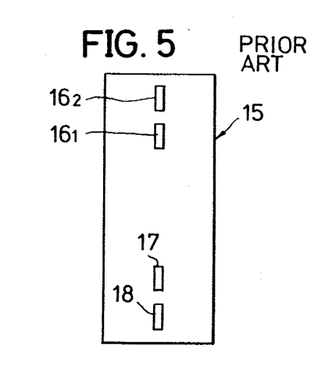
FIG. 5 shows the construction of an example of a stationary head in a conventional helical scan type magnetic recording apparatus.

On the other hand, a stationary head part employed in the conventional one-body type VTR for broadcasting use has a construction shown in FIG. 5. In a conventional stationary head part 15 shown in FIG. 5, stationary audio heads $16_1$ and $16_2$ are arranged in an upper portion thereof while a stationary control head 17 and a stationary time code head 18 are respectively arranged in a lower portion thereof. A stationary head part in which the positions of the audio heads $16_1$ and $16_2$ and the positions of the control and time code heads 17 and 18 are interchanged is also known.

However, in the conventional stationary head part 15, the mutual interference described before becomes a problem because the control head 17 and the time code head 18 are arranged adjacent to each other.

On the other hand, according to the stationary head part 51 employed in the present embodiment, the control head 56 is arranged in the lower portion thereof while the time code head 55 is arranged in a central portion thereof. As a result, a control pulse signal and a time code signal are respectively recorded on the control track 22 and the time code track 23 which are sufficiently separated from each other via the first oblique tracks $T_{Y1}$ through $T_{Y16}$, and it is thus possible to prevent generation of a mutual interference of the control pulse signal and the time code signal.

Figure 6A:
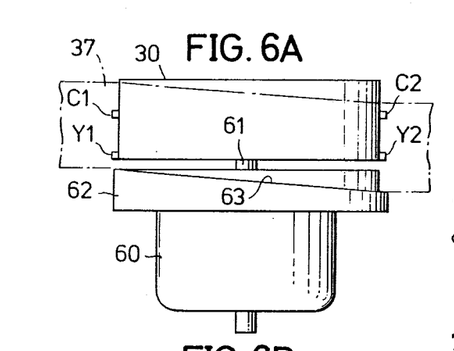
FIGS. 6A and 6B are a front view and a plan view respectively showing an embodiment of an arrangement of rotary heads and the like which may be applied to the helical scan type magnetic recording apparatus according to the present invention.
Figure 6B:
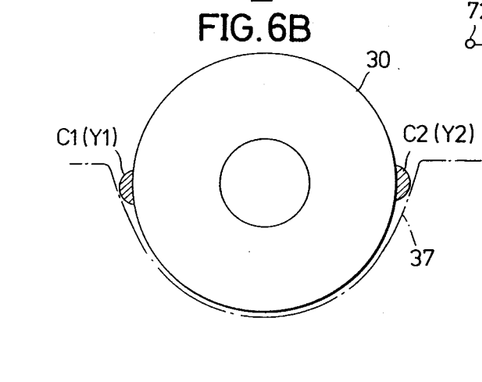

The upper rotary drum 30 is mounted with the rotary heads Y1, Y2, C1 and C2 as shown in FIGS. 6A and 6B. The construction of the upper rotary drum 30 itself is the same as that disclosed in the Japanese Patent Application No. 60-35827 mentioned before. In FIG. 6A, a motor shaft 61 of a motor 60 penetrates a central portion of a lower stationary drum 62 and is fixed to a central portion of the upper rotary drum 30 which has a cylindrical shape in the present embodiment. Accordingly, only the rotary drum 30 is rotated by the motor 60. A tape guide 63 is provided on the stationary drum 62. The lower end portion of the magnetic tape 37 is guided by the tape guide 63, and the magnetic tape 37 is wrapped obliquely around the outer peripheral surfaces of the rotary and stationary drums 30 and 62 over an angular range of approximately 180° and moves under the guidance of the tape guide 63.

As shown in a plan view in FIG. 6B, the rotary heads Y1 and Y2 are mounted at diametrical positions on a rotational plane of the rotary drum 30, and further, the rotary heads C1 and C2 are also mounted at diameterical positions on the rotational plane of the rotary drum 30. As may be seen from FIG. 6A, the rotary heas Y1 and Y2 are provided at the same height position on the rotary drum 30, and similarly, the rotary heads C1 and C2 are provided at the same height position on the rotary drum 30. In addition, as may be seen from FIGS. 6A and 6B, the rotary heads Y1 and C1 are provided at height positions which are separated in an axial direction of the rotary drum 30, but the rotary heads Y1 and C1 are provided at approximately the same position on the rotational plane of the rotary drum 30. A similar relationship exists between the rotary heads Y2 and C2.

Figure 7:
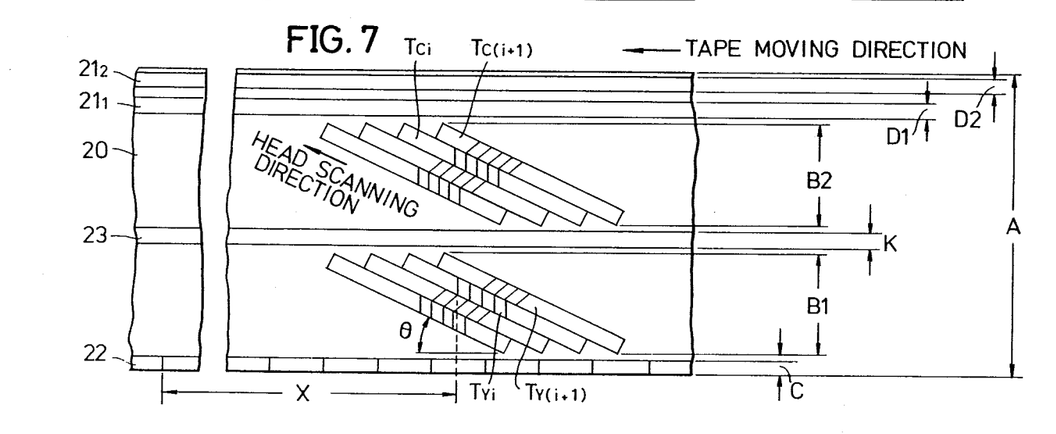
FIG. 7 shows essential parts of the tracks pattern shown in FIG. 1.

The track pattern shown in FIG. 1 is formed by the stationary head part 51 and the rotary heads Y1, Y2, C1 and C2, and essential parts of this track pattern are shown in FIG. 7. In the case where a color video signal which is to be recorded has a field frequency of 60 Hz and 525 scanning lines, for example, a width A of the magnetic tape is 12.65 mm, widths B1 and B2 of the video tracks in the width direction of the magnetic tape respectively are 5.0 mm, a width C of the control track 22 is 0.5 mm, a width K of the time code track 23 is 0.4 mm, and widths D1 and D2 of the control tracks $21_1$ and $21_2$ respectively are 0.35 mm. In FIG. 7, X denotes a distance between a position on the magnetic tape at an exit of the rotary drum 30 along a tape moving direction at a certain time immediately before the rotary head Y2 completes forming a track $T_{Y(i+1)}$ and a position on the magnetic tape where the control head 56 records the control pulse signal at this certain time. For example, a distance between the rotary heads C1 and Y1 and a distance between the rotary heads C2 and Y2 and 5.7 mm, respectively. Furthermore, the rotary heads Y1, Y2, C1 and C2 respectively have gaps of azimuth angles of $+10°\pm10'$, $-10°\pm10'$, $+10°\pm10'$ and $-10°\pm10'$ with respect to zero azimuth angle, where a positive angle is taken clockwise from the zero azimuth angle and a negative angle is taken counterclockwise from the zero azimuth angle.

Figure 8:
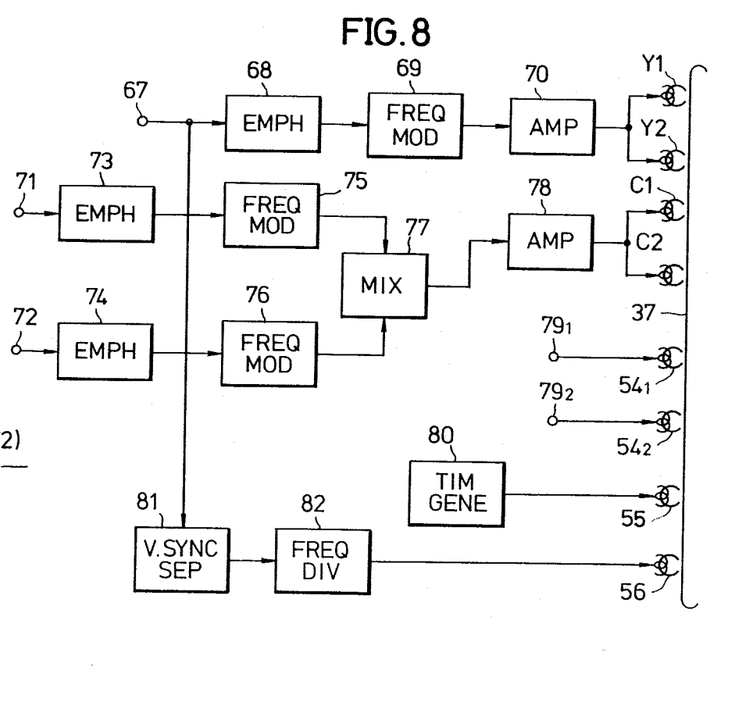
FIG. 8 is a system block diagram showing an example of a signal recording system which may be applied to the helical scan type magnetic recording apparatus according to the present invention.
Figure 9:
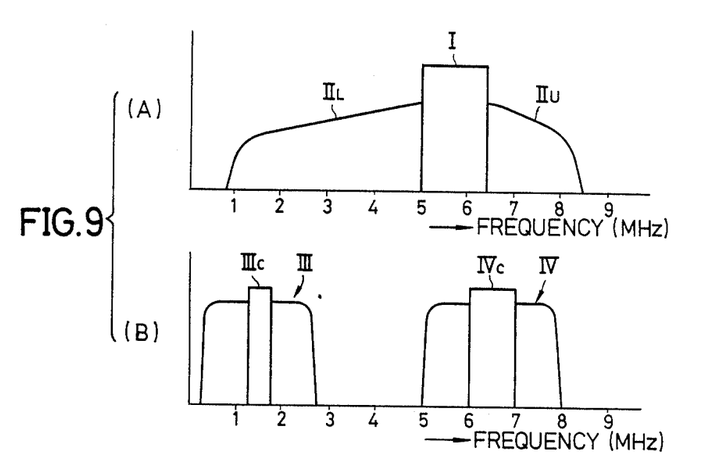
FIGS. 9(A) and 9(B) respectively show examples of frequency spectrums of signals at essential parts of the block system shown in FIG. 8.

Next, description will be given with respect to a signal recording system of the recording apparatus according to the present invention by referring to FIGS. 8 and 9. The recording system itself is the same as that of the apparatus disclosed in the Japanese Patent Application No. 60-35827 mentioned before. In FIG. 8, those parts which are the same as those corresponding parts in FIGS. 4, 6A and 6B are designated by the same reference numerals.

In FIG. 8, a luminance signal applied to an input terminal 67 is supplied to an emphasis circuit 68 wherein the level of a predetermined high frequency component of the luminance signal is emphasized. An output luminance signal of the emphasis circuit 68 is supplied to a frequency modulator 69 wherein the luminance signal is frequency-modulated into an FM luminance signal. FIG. 9(A) shows an example of a frequency spectrum of the FM luminance signal. In FIG. 9(A), I denotes a carrier deviation band of 5 to 6.5 MHz of the FM luminance signal, and $II_U$ and $II_L$ respectively denote upper and lower sidebands of the FM luminance signal. The FM luminance signal is passed through a recording amplifier 70 and a rotary transformer (not shown) and is supplied to the rotary heads Y1 and Y2.

On the other hand, color difference signals B-Y and R-Y applied to respective input terminals 71 and 72 are supplied to respective emphasis circuits 73 and 74 wherein high frequency components of the color difference signals are emphasized. An output color difference signal B-Y of the emphasis circuit 73 is supplied to a frequency modulator 75 wherein the color difference signal B-Y frequency-modulates a first carrier, and a first FM color difference signal is obtained from the frequency modulator 75. An output color difference signal R-Y of the emphasis circuit 74 is supplied to a frequency modulator 76 wherein the color difference signal R-Y frequency-modulates a second carrier, and a second FM color difference signal is obtained from the frequency modulator 76. FIG. 9(B) shows examples of frequency spectrums of the first and second FM color difference signals. In FIG. 9(B), III denotes the frequency spectrum of the first FM color difference signal which is obtained by frequency-modulating the first carrier by the color difference signal B-Y, and a carrier deviation band IIIc of the first FM color difference signal is 1.25 to 1.75 MHz, for example. On the other hand, IV denotes the frequency spectrum of the second FM color difference signal which is obtained by frequency-modulating the second carrier by the color difference signal R-Y, and a carrier deviation band IVc of the second FM color difference signal is 6 to 7 MHz, for example. The first and second FM color difference signals are supplied to a mixing circuit 77 wherein the two signals are frequency-division-multiplexed. An output frequency division multiplexed signal of the mixing circuit 77 is passed through a recording amplifier 78 and a rotary transformer (not shown) and is supplied to the rotary heads C1 and C2.

During the first one field, the tracks $T_{Y1}$ and $T_{C1}$ shown in FIG. 1 are simultaneously and independently formed on the magnetic tape 37 by the respective rotary heads Y1 and C1. During the second one field, the tracks $T_{Y2}$ and $T_{C2}$ are simultaneously and independently formed on the magnetic tape 37 by the respective rotary heads Y2 and C2. Similarly thereafter, the pair of rotary heads Y1 and C1 and the pair of rotary heads Y2 and C2 alternately form a pair of tracks for every one field, and the tracks $T_{Y3}$ and $T_{C3}$, $T_{Y4}$ and $T_{C4}$, $T_{Y5}$ and $T_{C5}$, ... are successively formed on the tape 37. The FM luminance signal having the frequency spectrum shown in FIG. 9(A) is recorded on the tracks $T_{Y1}$ through $T_{Y16}$, while the frequency division multiplexed signal which comprises the first and second FM color difference signals having the frequency spectrums shown in FIG. 9(B) is recorded on the tracks $T_{C1}$ through $T_{C16}$.

At the same time as when the tracks $T_{Y1}$ through $T_{Y16}$ and the tracks $T_{C1}$ through $T_{C16}$ are formed on the tape 37, right-channel and left-channel audio signals from input terminals $79_1$ and $79_2$ are recorded on the respective audio tracks $21_1$ and $21_2$ by the audio heads $54_1$ and $54_2$ described before. In addition, a known time code signal from a time code generator 80 is recorded on the time code track 23 by the time code head 55. The time code signal indicates the absolute address on the tape by the hour, minute, second, and a minimum unit of television frame. On the other hand, a vertical synchronizing signal is separated from the luminance signal in a vertical synchronizing signal separating circuit 81, and the separated luminance signal is frequency-divided by ½ into a control pulse signal in a frequency divider 82. This control pulse signal from the frequency divider 82 is recorded on the control track 22 by the control head 56. The control pulse signal is used in a capstan servo system (not shown) or a head servo system (not shown) in the reproducing mode.

Figure 10:
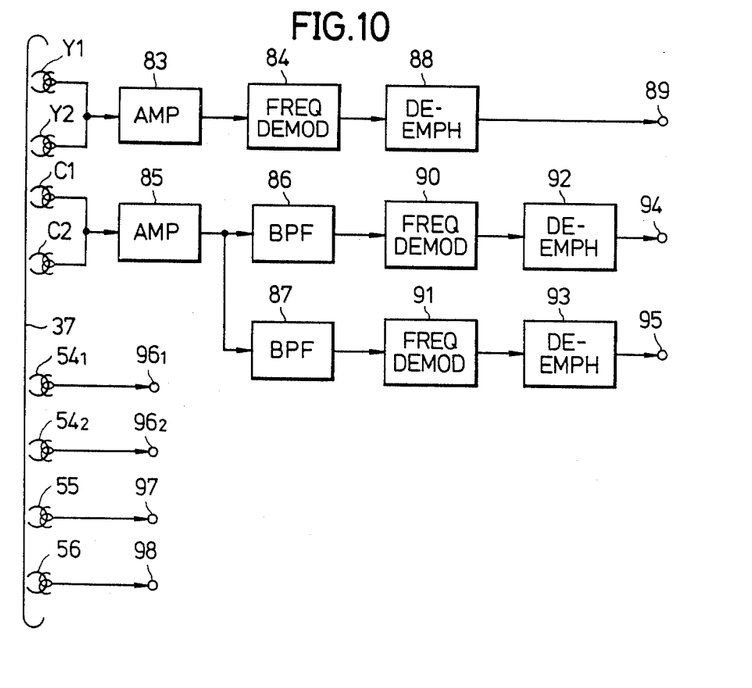
FIG. 10 is a system block diagram showing an example of a reproducing apparatus.

Next, description will be given with respect to the operation in the reproducing mode by referring to the block system shown in FIG. 10. The pre-recorded tracks $T_{Y1}$ through $T_{Y16}$ on the tape 37 are alternately scanned by the rotary heads Y1 and Y2 for every one field, and the FM luminance signals are reproduced from the pre-recorded tracks $T_{Y1}$ through $T_{Y16}$. The reproduced FM luminance signals are passed through a rotary transformer (not shown), a switching circuit (not shown) for forming the reproduced FM luminance signals into a continuous reproduced FM luminance signal and a reproducing pre-amplifier 83, and an output reproduced FM luminance signal of the reproducing pre-amplifier 83 is supplied to a frequency demodulator 84. On the other hand, at the same time, the pre-recorded tracks $T_{C1}$ through $T_{C16}$ on the tape 37 are alternately scanned by the rotary heads C1 and C2 for every one field, and the frequency division multiplexed signals are reproduced from the pre-recorded tracks $T_{C1}$ through $T_{C16}$. The reproduced frequency division multiplexed signals are passed through a rotary transformer (not shown), a switching circuit (not shown) for forming the reproduced frequency division multiplexed signals into a continuous reproduced frequency division multiplexed signal and a reproducing pre-amplifier 85, and an output reproduced frequency division multiplexed signal of the reproducing pre-amplifier 85 is supplied to bandpass filters 86 and 87 wherein the first and second FM color difference signals are separated, respectively.

The reproduced FM luminance signal is frequency-demodulated into a reproduced luminance signal in the frequency demodulator 84, and the reproduced luminance signal is passed through a de-emphasis circuit 88 and is then outputted via an output terminal 89. On the other hand, a reproduced first FM color difference signal obtained from the bandpass filter 86 is supplied to a frequency demodulator 90 wherein the reproduced first FM color difference signal is frequency-demodulated into a reproduced color difference signal B-Y. Similarly, a reproduced second FM color difference signal obtained from the bandpass filter 87 is supplied to a frequency demodulator 91 wherein the reproduced second FM color difference signal is frequency-demodulated into a reproduced color difference signal R-Y. The reproduced color difference signals B-Y and R-Y are passed through respective de-emphasis circuits 92 and 93 and are outputted via output terminals 94 and 95.

Hence, according to the present embodiment, it is possible to completely prevent the mutual interference between the FM luminance signals reproduced from the tracks $T_{Y1}$ through $T_{Y16}$ and the FM color difference signals reproduced from the tracks $T_{C1}$ through $T_{C16}$, because the recording region Wa in which the tracks $T_{Y1}$ through $T_{Y16}$ are formed and the recording region Wb in which the tracks $T_{C1}$ through $T_{C16}$ are formed are completely separated from each other in the width direction of the magnetic tape. Furthermore, even if a tracking error should occur and the rotary heads Y1 and Y2 (or C1 and C2) scan tracks adjacent to the intended tracks which should be scanned, the adjacent tracks are recorded with FM luminance signals of one field before or after the intended FM luminance signals (or recorded with FM color difference signals of one field before or after the intended FM color difference signals). In other words, the signals recorded on the intended tracks and the signals recorded on the adjacent tracks are of the same kind. Since a field correlation exists between the signals of the same kind (that is, the FM luminance signals or the FM color difference signals) recorded in the two mutually adjacent tracks, it is possible to eliminate the crosstalk from the adjacent tracks by use of a crosstalk cancelling circuit (not shown) which uses the field correlation to eliminate the crosstalk.

The audio signals recorded on the audio tracks $21_1$ and $21_2$ are reproduced by the audio heads $54_1$ and $54_2$ and are outputted via output terminals $96_1$ and $96_2$. At the same time, the time code signal recorded on the time code track 23 and the control pulse signal recorded on the control track 22 are respectively reproduced by the time code head 55 and the control head 56 and are outputted via respective output terminals 97 and 98.

The present invention is not limited to the embodiment described heretofore, and for example, the location of the time code track 23 is not limited to that of the embodiment. In the embodiment, the time code track 23 is formed in the guard band portion Wc which separates the tracks $T_{Y1}$ through $T_{Y16}$ formed in the recording region Wa and the tracks $T_{C1}$ through $T_{C16}$ formed in the recording region Wb in the width direction of the tape 37. Because the lower end portion of the tape 37 makes contact with the tape guide 63 and is guided thereby, there are possibilities that the magnetic surface of the tape 37 may become damaged in the lower end portion of the tape 37 along the longitudinal direction of the tape 37 and the lower end portion of the tape 37 may become bent. When such damages occur in the tape 37 and a signal dropout occurs, it is necessary to minimize the effects of the signal dropout. For this reason, since the frequency of the control pulse signal is relatively low compared to that of the time code signal, the control track 22 is formed in the lower end portion of the tape 37 in the embodiment.

However, the damage to the magnetic surface in the lower end portion of the tape 37 and the bend in the lower end portion of the tape 37 only rarely occur. Hence, it is possible to form the time code track in the lower end portion of the magnetic tape and form the control track in the guard band portion Wc. Furthermore, the three kinds of tracks, that is, the audio tracks $21_1$ and $21_2$, the control track 22 and the time code track 23 simply need to be located at three locations which are the upper end portion of the tape 37, the lower end portion of the tape 37 and the guard band portion Wc, and the location of the three kinds of tracks are not limited to those described heretofore.

The present invention can also be applied to a video signal recording apparatus which forms a track pattern shown in FIG. 11. This video signal recording apparatus simultaneously and independently records three kinds of signals (for example, a luminance signal and two kinds of color difference signals or three primary color signals) which constitute a color video signal on three tracks which are separated from each other in the width direction of the magnetic tape by use of three pairs of rotary heads. The rotary heads in each part of rotary heads are mounted at diametrical positions on a rotational plane of a rotary body at the same height position in the axial direction of the rotary body. The three pairs of rotary heads are mounted at approximately the same positions on the rotational plane of the rotary body, but the heigth positions of the three pairs of rotary heads are different in the axial direction of the rotary body.

In FIG. 11, audio tracks $101_1$ and $101_2$ are formed in an upper end portion of a magnetic tape 100, and a control track 102 is formed in a lower end portion of the tape 100. First oblique tracks T11 through T116 are formed in a recording region W1, second oblique tracks T21 through T216 are formed in a recording region w2, and third oblique tracks T31 through T316 are formed in a recording region W3. The first through third oblique tracks have an inclination angle $\alpha$. The recording regions W1 through W3 are separated from each other in the width direction of the tape 100. A time code track 103 is formed between the recording regions W1 and W2. A guard band portion G is formed between the recording regions W2 and W3.

The time code track 103 may be formed in the guard band portion G. Furthermore, it is possible to form the control track 102 between the recording regions W1 and W2 or between the recording regions W2 and W3.

The time code signal is recorded on the time code track 23 (or 103) by a stationary head which is sufficiently separated in the width direction of the tape 37 (or 100) from a stationary head which records the control signal on the control track 22 (or 102). However, the time code signal may be recorded on the magnetic tape simultaneously as the video signal and the like, or the time code signal may be recorded afterwards on a pre-recorded magnetic tape which is pre-recorded with the video signal and the like. When playing the pre-recorded magnetic tape on which no signal is pre-recorded on the time code track 23 (or 103), it is possible to record the time code signal on the unrecorded time code track 23 (or 103). For this reason, it is possible to use the time code track 23 (or 103) as an audio signal recording track for the after-recording. In this case, it is possible to record on the unrecorded time code track 23 (or 103) the time code signal or the after-recording audio signal by arbitrarily switching a time code recording system and an after-recording audio signal recording system.

An I-signal and a Q-signal may be used as the first and second color difference signals. Moreover, it is possible to record and reproduce two kinds of color difference signals which are subjected to a time division multiplexing process instead of a frequency division multiplexing process. In this case, the two kinds of color difference signals R-Y and B-Y are time-base-compressed by $\frac{1}{2}$ by known means, alternatively time-divisionmultiplexed for every H/2 (where H denotes one horizontal scanning period) so as to obtain a time division multiplexed signal, the time division multiplexed signal is frequency-modulated so as to obtain an FM time division multiplexed signal, and this FM time division multiplexed signal is recorded and reproduced by the rotary heads C1 and C2. The reproduced FM time division multiplexed signal is frequency-demodulated, alternately supplied to two time base expanding circuits which expand the time base by two for every H/2, and reproduced color difference signals R-Y and B-Y which are returned to the original time base are obtained from the two time base expanding circuits.

The signal which is recorded and reproduced by the rotary heads C1 and C2 simply needs to be a chrominance signal. For example, the signal which is recorded and reproduced by the rotary heads C1 and C2 may be a multiplexed signal of a carrier chrominance signal which has been frequency-converted into a low frequency range (that is, a frequency converted carrier chrominance signal) and a bias signal, an FM frequency converted carrier chrominance signal which is obtained by frequency-modulating a carrier by the frequency converted carrier chrominance signal, an FM line-sequential color difference signal, a multiplexed signal of three kinds of FM signals which are obtained by independently frequency-modulating the three primary color signals and the like. Furthermore, the rotary heads Y1, Y2, C1 and C2 may be mounted on a rotary body other than the rotary drum described before. For example, the rotary heads may be mounted on a flat rectangular head bar which is arranged in two stages. In addition, the rotary heads Y1 Y2, C1 and C2 may have gaps of the same azimuth angle and form a track pattern in which a guard band is provided between mutually adjacent oblique tracks. It is not essential for the azimuth angles of the rotary heads Y1 and C1 to be selected to the same azimuth angle, and it is not essential for the azimuth angles of the rotary heads Y2 and C2 to be selected to the same azimuth angle.

Further, the present invention is not limited to these embodiments, but various variations and modifications may be made without departing from the scope of the present invention.

What is claimed is:

1. A helical scan type magnetic recording apparatus which forms tracks which are mutually separated in a width direction of a magnetic tape, said helical scan type magnetic recording apparatus comprising:
   a rotary body wrapped with the magnetic tape on an outer peripheral surface thereof over a predetermined angular range, said rotary body having a tape guide for guiding a part of the magnetic tape;

n pairs of rotary heads mounted on said rotary body, where n is equal to two or three, each pair out of said n pairs of rotary heads being constituted by two rotary heads which are mounted at mutually opposite positions on a rotational plane of said rotary body at the same height position, said n pairs of rotary heads being mounted at different positions in an axial direction of said rotary body but at approximately the same positions on the rotational plane of said rotary body;

recording means for recording three kinds of signals which constitute a color video signal on the magnetic tape by simultaneously and independently forming n oblique tracks which are mutually separated in the width direction of the magnetic tape in units of one field of the color video signal by use of said n pairs of rotary heads;

first stationary head means for recording audio signals by forming one or two audio tracks in a longitudinal direction of the magnetic tape in an arbitrary recording region out of three or four recording regions in which the oblique tracks are not formed, said three or four recording regions including an upper end portion of the magnetic tape, a lower end portion of the magnetic tape and a guard band portion between two oblique tracks which are mutually separated in the width direction of the magnetic tape out of the n oblique tracks;

second stationary head means for recording a control pulse signal by forming a control track in the longitudinal direction of the magnetic tape in an arbitrary recording region other than the recording region in which the one or two audio tracks are formed out of said three or four recording regions; and third stationary head means for recording a specific information signal for forming a specific information signal recording track in the longitudinal direction of the magnetic tape in a remaining recording region out of one or two recording regions in which the audio track nor the control track is formed out of said three or four recording regions.

2. A magnetic recording apparatus as claimed in claim 1 in which said second stationary head means is arranged at such a position that said control track is formed in the recording region which is in the lower end portion of the magnetic tape.

3. A magnetic recording apparatus as claimed in claim 1 in which said third stationary head means records a time code signal as said specific information signal.

4. A magnetic recording apparatus as claimed in claim 1 in which said third stationary head means selectively records as said specific information signal either a time code signal or an audio signal which is different from the audio signals recorded on said audio track.

5. A magnetic recording apparatus as claimed in claim 1 in which n is equal to two, said recording means comprising first means for recording a luminance signal of the color video signal by forming first oblique tracks on the magnetic tape by use of one of two pairs of rotary heads and second means for recording two kinds of color difference signals which constitute the color video signal together with the luminance signal by forming second oblique tracks on the magnetic tape by use of the other of the two pairs of rotary heads, said first oblique tracks being separated from said second oblique tracks in the width direction of the magnetic tape, said third stationary head means recording said specific information signal by forming said specific information signal recording track in a guard band portion between said first and second oblique tracks.

* * * * *